US011677809B2

(12) United States Patent
Scoda et al.

(10) Patent No.: US 11,677,809 B2
(45) Date of Patent: Jun. 13, 2023

(54) METHODS FOR TRANSFORMING A SERVER SIDE TEMPLATE INTO A CLIENT SIDE TEMPLATE AND DEVICES THEREOF

(71) Applicant: Usablenet Inc, New York, NY (US)

(72) Inventors: Enrico Scoda, Martignacco (IT); Luca Pittino, Pozzuolo del Friuli (IT); Simone Pezzano, Tavagnacco (IT)

(73) Assignee: USABLENET INC., New York, NY (US)

( * ) Notice: Subject to any disclaimer, the term of this patent is extended or adjusted under 35 U.S.C. 154(b) by 13 days.

(21) Appl. No.: 14/883,886

(22) Filed: Oct. 15, 2015

(65) Prior Publication Data
US 2017/0111431 A1    Apr. 20, 2017

(51) Int. Cl.
*H04L 67/025* (2022.01)
*G06F 16/958* (2019.01)
*G06F 40/154* (2020.01)
*G06F 40/186* (2020.01)

(52) U.S. Cl.
CPC .......... *H04L 67/025* (2013.01); *G06F 16/986* (2019.01); *G06F 40/154* (2020.01); *G06F 40/186* (2020.01)

(58) Field of Classification Search
CPC ......... G06F 8/40–51; G06F 16/95–986; G06F 16/986; G06F 40/154; G06F 40/186; H04L 67/025
See application file for complete search history.

(56) References Cited

U.S. PATENT DOCUMENTS

| 6,675,354 | B1 * | 1/2004 | Claussen | G06F 40/221 715/255 |
| 6,697,849 | B1 * | 2/2004 | Carlson | G06F 9/54 709/219 |
| 6,718,515 | B1 * | 4/2004 | Conner | H04L 67/02 707/999.103 |

(Continued)

FOREIGN PATENT DOCUMENTS

| EP | 2824578 A1 | 1/2015 |
| WO | 2008043050 A2 | 4/2008 |

OTHER PUBLICATIONS

Bergsten, Hans. JSTL 1.0: Standardizing JSP, Part 1. published Aug. 14, 2002, O'Reilly, pp. 1-10 (pdf), 2002.*
J. Chu and T. Dean, "Automated Migration of List Based JSP Web Pages to AJAX," 2008 Eighth IEEE International Working Conference on Source Code Analysis and Manipulation, Beijing, China, 2008, pp. 217-226, doi: 10.1109/SCAM.2008.29. (Year: 2008).*

(Continued)

*Primary Examiner* — Mohamed A. Wasel
(74) *Attorney, Agent, or Firm* — Troutman Pepper Hamilton Sanders LLP (Rochester)

(57) ABSTRACT

A method, non-transitory computer readable medium, and web content server that assists with transforming server side template to client side template includes obtaining a server side template comprising a plurality of Hypertext Markup Language (HTML) and logical instructions responsive to a request for webpage received from a client device. The obtained server side template is parsed to generate a document object model. The parsed document object model is traversed to identify the plurality of HTML and logical instructions. The obtained server side template is transformed to a client side template by replacing each of the identified plurality of HTML and logical instructions during the traversing with an equivalent JavaScript code.

18 Claims, 7 Drawing Sheets

(56) References Cited

U.S. PATENT DOCUMENTS

| | | | | |
|---|---|---|---|---|
| 6,718,516 B1* | 4/2004 | Claussen | G06F 16/986 | 707/E17.118 |
| 6,732,330 B1* | 5/2004 | Claussen | G06F 16/986 | 707/E17.118 |
| 6,779,152 B1* | 8/2004 | Conner | G06F 40/143 | 707/999.103 |
| 6,845,503 B1* | 1/2005 | Carlson | H04L 67/34 | 717/166 |
| 6,859,834 B1* | 2/2005 | Arora | H04L 67/1008 | 709/227 |
| 6,879,995 B1* | 4/2005 | Chinta | H04L 67/24 | 709/204 |
| 6,981,211 B1* | 12/2005 | Claussen | G06F 16/9027 | 715/239 |
| 6,981,212 B1* | 12/2005 | Claussen | G06F 16/986 | 717/148 |
| 7,000,185 B1* | 2/2006 | Murren | G06F 17/30893 | 707/E17.117 |
| 7,047,318 B1* | 5/2006 | Svedloff | G06F 17/3089 | 707/E17.116 |
| 7,185,063 B1* | 2/2007 | Kasriel | H04L 67/2842 | 709/219 |
| 7,188,214 B1* | 3/2007 | Kasriel | G06F 16/9574 | 709/219 |
| 7,266,766 B1* | 9/2007 | Claussen | G06F 8/30 | 717/148 |
| 7,788,341 B1* | 8/2010 | Burns | G06F 16/972 | 709/219 |
| 7,882,501 B1* | 2/2011 | Carlson | G06F 8/656 | 709/221 |
| 7,975,019 B1* | 7/2011 | Green | G06Q 30/0641 | 705/26.1 |
| 7,975,020 B1* | 7/2011 | Green | G06Q 30/0241 | 705/26.1 |
| 8,191,038 B1* | 5/2012 | Samuel | G06F 8/41 | 717/136 |
| 8,893,294 B1* | 11/2014 | Steele, III | G06F 40/143 | 726/22 |
| 9,275,167 B2* | 3/2016 | Melnyk | H04L 67/56 | |
| 9,292,282 B2* | 3/2016 | Allen | H04L 67/42 | |
| 9,398,071 B1* | 7/2016 | Burciu | H04L 65/602 | |
| 9,411,581 B2* | 8/2016 | Peled | G06F 8/51 | |
| 9,577,889 B1* | 2/2017 | Dumitrascu | H04L 41/22 | |
| 9,690,764 B1* | 6/2017 | Batni | G06F 40/103 | |
| 9,727,397 B2* | 8/2017 | Ni | G06F 8/41 | |
| 9,754,245 B1* | 9/2017 | Davison | G06Q 20/36 | |
| 9,824,075 B1* | 11/2017 | Gross | G06F 40/174 | |
| 10,115,141 B1* | 10/2018 | Warman | H04L 63/0281 | |
| RE47,735 E* | 11/2019 | Reams | H04N 21/4117 | |
| 2002/0122054 A1* | 9/2002 | Hind | G06F 16/986 | 707/E17.118 |
| 2003/0025732 A1* | 2/2003 | Prichard | G06F 8/38 | 715/765 |
| 2003/0182458 A1* | 9/2003 | Ali | G06F 8/38 | 719/310 |
| 2004/0102197 A1* | 5/2004 | Dietz | H04W 4/00 | 455/456.2 |
| 2004/0111356 A1* | 6/2004 | Srivastava | G06Q 20/381 | 705/37 |
| 2004/0168184 A1* | 8/2004 | Steenkamp | H04N 21/63345 | 725/38 |
| 2004/0216042 A1* | 10/2004 | Consolatti | G06F 9/542 | 715/234 |
| 2005/0021467 A1* | 1/2005 | Franzdonk | G06F 21/10 | 705/51 |
| 2006/0064399 A1* | 3/2006 | De Sio | G06F 16/958 | |
| 2006/0112123 A1* | 5/2006 | Clark | G06F 40/18 | |
| 2006/0242563 A1* | 10/2006 | Liu | G06F 40/154 | 707/999.003 |
| 2006/0253508 A1* | 11/2006 | Colton | G06F 8/52 | |
| 2007/0055964 A1* | 3/2007 | Mirkazemi | G06F 8/41 | 717/118 |
| 2008/0028302 A1* | 1/2008 | Meschkat | G06F 8/38 | 715/255 |
| 2008/0098028 A1* | 4/2008 | Shan | G06F 16/972 | 707/999.102 |
| 2008/0127233 A1* | 5/2008 | Neil | G06F 8/45 | 719/330 |
| 2008/0133722 A1* | 6/2008 | Ramasundaram | G06F 16/972 | 709/222 |
| 2008/0281578 A1* | 11/2008 | Kumaran | G06F 17/28 | 704/2 |
| 2009/0138937 A1* | 5/2009 | Erlingsson | H04L 63/1416 | 726/1 |
| 2009/0158043 A1* | 6/2009 | Boyer | H04L 9/3281 | 713/176 |
| 2009/0177959 A1* | 7/2009 | Chakrabarti | G06F 16/951 | 715/234 |
| 2009/0210781 A1* | 8/2009 | Hagerott | G06F 9/4443 | 715/234 |
| 2009/0271771 A1* | 10/2009 | Fallows | G06F 9/45516 | 717/137 |
| 2009/0327858 A1* | 12/2009 | Tsun | G06Q 30/02 | 715/234 |
| 2010/0005115 A1* | 1/2010 | Richter | G06F 17/30569 | 707/E17.006 |
| 2010/0031233 A1* | 2/2010 | Li | G06F 9/541 | 717/106 |
| 2010/0037177 A1* | 2/2010 | Golsorkhi | G06Q 30/0603 | 715/818 |
| 2010/0083095 A1* | 4/2010 | Nikovski | G06F 17/30896 | 715/234 |
| 2010/0146376 A1* | 6/2010 | Reams | H04N 21/4622 | 715/208 |
| 2010/0153929 A1* | 6/2010 | Porras | G06F 8/47 | 717/139 |
| 2010/0269096 A1* | 10/2010 | Araya | G06F 16/8373 | 717/113 |
| 2010/0306366 A1* | 12/2010 | Cragun | G06F 8/656 | 709/224 |
| 2010/0306738 A1* | 12/2010 | Verma | G06F 16/972 | 717/115 |
| 2011/0035435 A1* | 2/2011 | Meng | G06F 9/54 | 709/203 |
| 2011/0161840 A1* | 6/2011 | Wong | G06F 8/35 | 715/760 |
| 2012/0047391 A1* | 2/2012 | Dhoolia | G06F 11/3604 | 714/E11.029 |
| 2012/0254467 A1* | 10/2012 | Kasper | H04L 67/02 | 709/246 |
| 2012/0290917 A1* | 11/2012 | Melnyk | G06F 16/9577 | 715/234 |
| 2013/0031085 A1* | 1/2013 | Wang | G06F 17/30935 | 707/718 |
| 2013/0091425 A1* | 4/2013 | Hughes | G06F 17/289 | 715/259 |
| 2013/0204867 A1* | 8/2013 | Lim | G06F 16/24578 | 707/723 |
| 2013/0227078 A1* | 8/2013 | Wei | H04L 67/02 | 709/224 |
| 2013/0298111 A1* | 11/2013 | Koseki | G06F 8/51 | 717/137 |
| 2013/0311875 A1* | 11/2013 | Pappas | G06F 17/2247 | 715/234 |
| 2013/0318503 A1* | 11/2013 | Li | G06F 9/45529 | 717/126 |
| 2013/0326333 A1* | 12/2013 | Hashmi | G06F 16/958 | 715/234 |
| 2014/0052617 A1* | 2/2014 | Chawla | G06Q 10/10 | 705/39 |
| 2014/0149836 A1* | 5/2014 | Bedard | G06F 17/2247 | 715/212 |
| 2014/0149837 A1* | 5/2014 | Bedard | G06F 17/246 | 715/212 |
| 2014/0149838 A1* | 5/2014 | Bedard | G06F 17/246 | 715/217 |
| 2014/0149839 A1* | 5/2014 | Bedard | G06F 17/246 | 715/220 |

(56) References Cited

U.S. PATENT DOCUMENTS

| | | | | |
|---|---|---|---|---|
| 2014/0281863 A1* | 9/2014 | Burckart | G06F 40/143 | 715/208 |
| 2014/0281876 A1* | 9/2014 | Schmidt | G06F 17/241 | 715/230 |
| 2014/0281904 A1* | 9/2014 | Burckart | G06F 16/972 | 715/234 |
| 2014/0281906 A1* | 9/2014 | Burckart | G06F 16/9577 | 715/234 |
| 2014/0337405 A1* | 11/2014 | Athas | H04L 67/26 | 709/203 |
| 2015/0142890 A1* | 5/2015 | Jia | H04L 67/30 | 709/204 |
| 2015/0143227 A1* | 5/2015 | Jia | G06F 16/957 | 715/234 |
| 2015/0160988 A1* | 6/2015 | Scomparim | G06F 7/00 | 719/318 |
| 2015/0169533 A1* | 6/2015 | Michael | G06F 17/248 | 715/235 |
| 2015/0178263 A1* | 6/2015 | Meschkat | G06F 17/248 | 715/235 |
| 2015/0363368 A1* | 12/2015 | Zhang | G06F 17/30893 | 715/222 |
| 2015/0379156 A1* | 12/2015 | Sun | G06F 16/211 | 715/234 |
| 2016/0012023 A1* | 1/2016 | Benjamin | G06F 17/2247 | 715/235 |
| 2016/0292298 A1* | 10/2016 | Yutani | G06F 13/00 | |
| 2016/0321038 A1* | 11/2016 | Ge | H04L 67/42 | |
| 2017/0046449 A1* | 2/2017 | Levi | G06F 17/30905 | |
| 2017/0262265 A1* | 9/2017 | Kellicker | G06F 8/51 | |
| 2018/0011832 A1* | 1/2018 | Buyukkokten | G06F 40/186 | |
| 2018/0218726 A1* | 8/2018 | Arumugam | G09B 5/04 | |
| 2018/0341628 A1* | 11/2018 | Waite | G06Q 30/0269 | |
| 2018/0357324 A1* | 12/2018 | Chakraborty | G06F 3/04895 | |
| 2021/0152627 A1* | 5/2021 | Pershin | G06F 16/2228 | |

OTHER PUBLICATIONS

S. Xu and T. Dean, "Transforming embedded Java code into custom tags," Fifth IEEE International Workshop on Source Code Analysis and Manipulation (SCAM'05), 2005, pp. 173-182, doi: 10.1109/SCAM.2005.27. (Year: 2005).*

Shannon Xu and T. Dean, "Modernizing JavaServer Pages by Transformation," Seventh IEEE International Symposium on Web Site Evolution, 2005, pp. 111-118, doi: 10.1109/WSE.2005.9. (Year: 2005).*

Oh, Jaewon, et al. "Automated transformation of template-based web applications into single-page applications." 2013 IEEE 37th Annual Computer Software and Applications Conference. IEEE, 2013. (Year: 2013).*

Wang, Qingling, et al. "An automatic approach to reengineering common website with AJAX." 2008 4th International Conference on Next Generation Web Services Practices. IEEE, 2008. (Year: 2008).*

Xu, Shannon, and Thomas Dean. "Modernizing javaserver pages by transformation." Seventh IEEE International Symposium on Web Site Evolution. IEEE, 2005. (Year: 2005).*

Chu, Jason. Transformation of round-trip web application to use AJAX. Diss. 2008. (Year: 2008).*

Han, Hao, et al. "Practice and Evaluation of Pagelet-Based Client-Side Rendering Mechanism." IEICE Transactions on Information and Systems 97.8 (2014): 2067-2083. (Year: 2014).*

Chu, Jason, and Thomas Dean. "Automated migration of list based JSP web pages to AJAX." 2008 Eighth IEEE International Working Conference on Source Code Analysis and Manipulation. IEEE, 2008. (Year: 2008).*

Hassan, Ahmed E., and Richard C. Holt. "Migrating web frameworks using water transformations." Proceedings 27th Annual International Computer Software and Applications Conference. COMPAC 2003. IEEE, 2003. (Year: 2003).*

PHP-to-Javascript/README, Oct. 1, 2013, Retrieved from the internet: URL:https://github.com/Danack/PHP-to-Javasript/blob/master/README.md.

EP Search Report for EP Application No. 16193291.8, dated Feb. 6, 2017.

* cited by examiner

METHODS FOR TRANSFORMING A SERVER SIDE TEMPLATE INTO A CLIENT SIDE TEMPLATE AND DEVICES THEREOF

FIELD

This technology generally relates to methods and devices for optimizing web content and, more particularly, methods for transforming a server side template into a client side template and devices thereof.

BACKGROUND

Many web sites are increasingly sophisticated and provide rich user experiences. Accordingly, in web development, the user or client side dynamic code is often crafted for each specific case to provide rich user experiences. In prior technologies, a dynamic Hypertext Markup Language (HTML) based template (server side template) is used to describe the websites to provide rich user experience. The dynamic HTML based template includes references to variables, express conditions, description of iterations and other types of HTML instructions. Accordingly, with the growth of client side web technologies, a need of having client side templates which would generate HTML directly on the browser grew as well.

Most commonly, the existing products working as client side templates are made of HTML extensions and are using JavaScript as logical language. However, as previously illustrated, the server side templates are dynamic HTML based templates which do not share most peculiarities with the current client side implementations. Therefore with prior technologies, software developers were required to know multiple programming and markup languages in order to develop and transform the server side template to client side templates. As noted earlier, with many websites having a sophisticated layout to provide rich user experience, the manual transformation of both server side templates and client side templates of one into another became a tedious task. Additionally, due to large amounts of human intervention (web developers), the methods used in the prior technologies also become inefficient and error prone.

SUMMARY

A method for transforming server side template to a client side template includes obtaining, by a web content server, a server side template comprising a plurality of Hypertext Markup Language (HTML) and logical instructions responsive to a request for webpage received from a client device. The obtained server side template is parsed by the web content server to generate a document object model. The parsed document object model is traversed by the web content server to identify the plurality of HTML and logical instructions. The obtained server side template is transformed by the web content server to a client side template by replacing each of the identified plurality of HTML instructions and logical during the traversing with an equivalent JavaScript code.

A non-transitory computer readable medium having stored thereon instructions transforming server side template to a client side template comprising machine executable code which when executed by a processor, causes the processor to perform steps including obtaining a server side template comprising a plurality of Hypertext Markup Language (HTML) and logical instructions responsive to a request for webpage received from a client device. The obtained server side template is parsed to generate a document object model. The parsed document object model is traversed to identify the plurality of HTML and logical instructions. The obtained server side template is transformed to a client side template by replacing each of the identified plurality of HTML and logical instructions during the traversing with an equivalent JavaScript code.

A web content server includes a processor coupled to a memory and configured to execute programmed instructions stored in the memory including obtaining a server side template comprising a plurality of Hypertext Markup Language (HTML) and logical instructions responsive to a request for webpage received from a client device. The obtained server side template is parsed to generate a document object model. The parsed document object model is traversed to identify the plurality of HTML and logical instructions. The obtained server side template is transformed to a client side template by replacing each of the identified plurality of HTML and logical instructions during the traversing with an equivalent JavaScript code.

This technology provides a number of advantages including methods, non-transitory computer readable medium, and a web content server for transforming templates designed for the server side execution to templates that are suitable to be executed on the client side. Additionally, this technology allows developers to use one language for both developing server side pages and client side content. Further with this technology, the server side templates can be transformed to client side templates that allow the creation of complex web pages where the displayed data can change without the page being reloaded. Even further, with this technology by directly transforming the server side template to a client side template, an autonomous JavaScript based template is created for the client side without the need of an intermediate template language to be reinterpreted on the browser of the client device.

DETAILED DESCRIPTION

Figure 1:
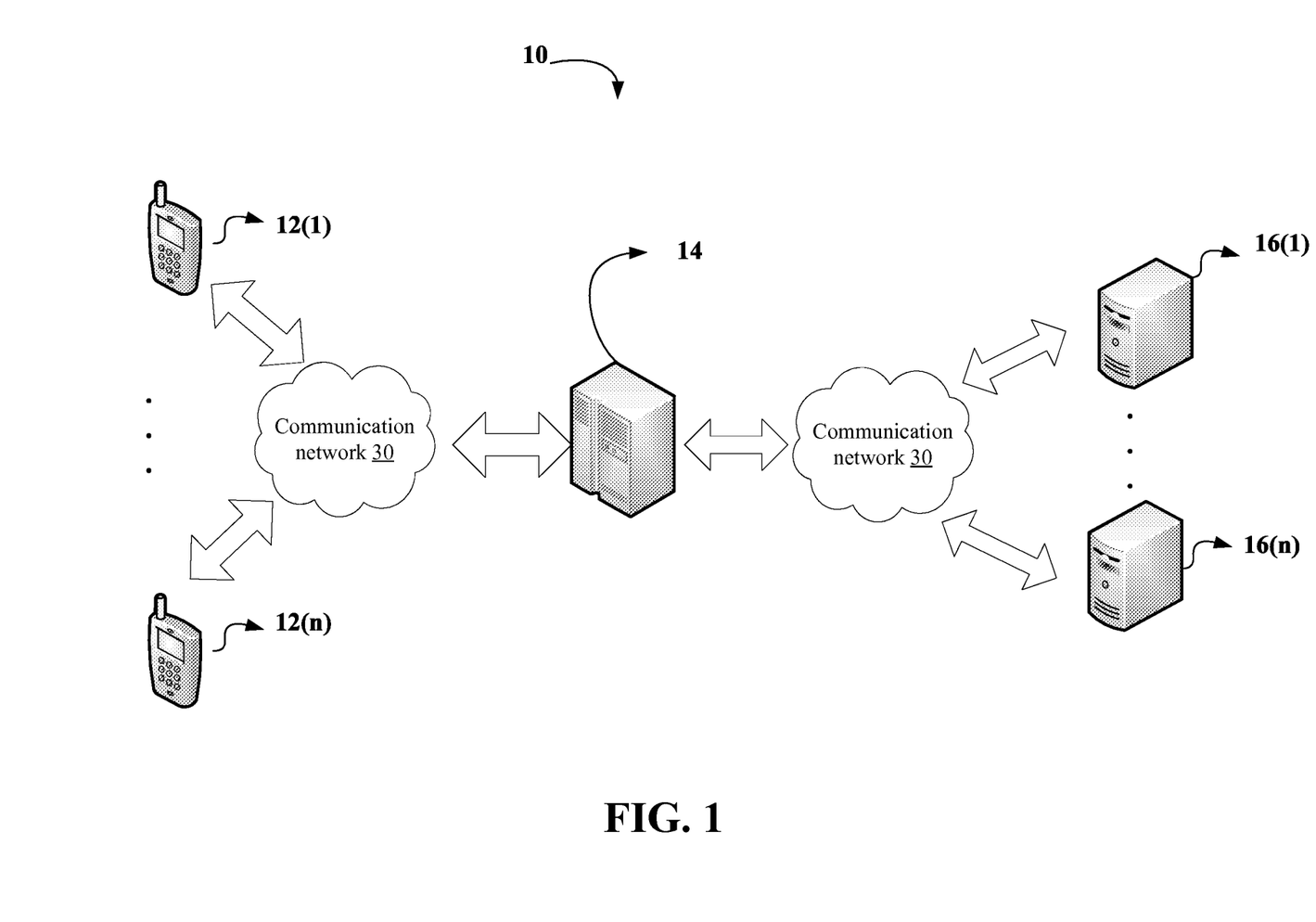
FIG. 1 is a block diagram of an environment with an example of a web content server that effectively transforms a server side template into a client side template.
Figure 2:
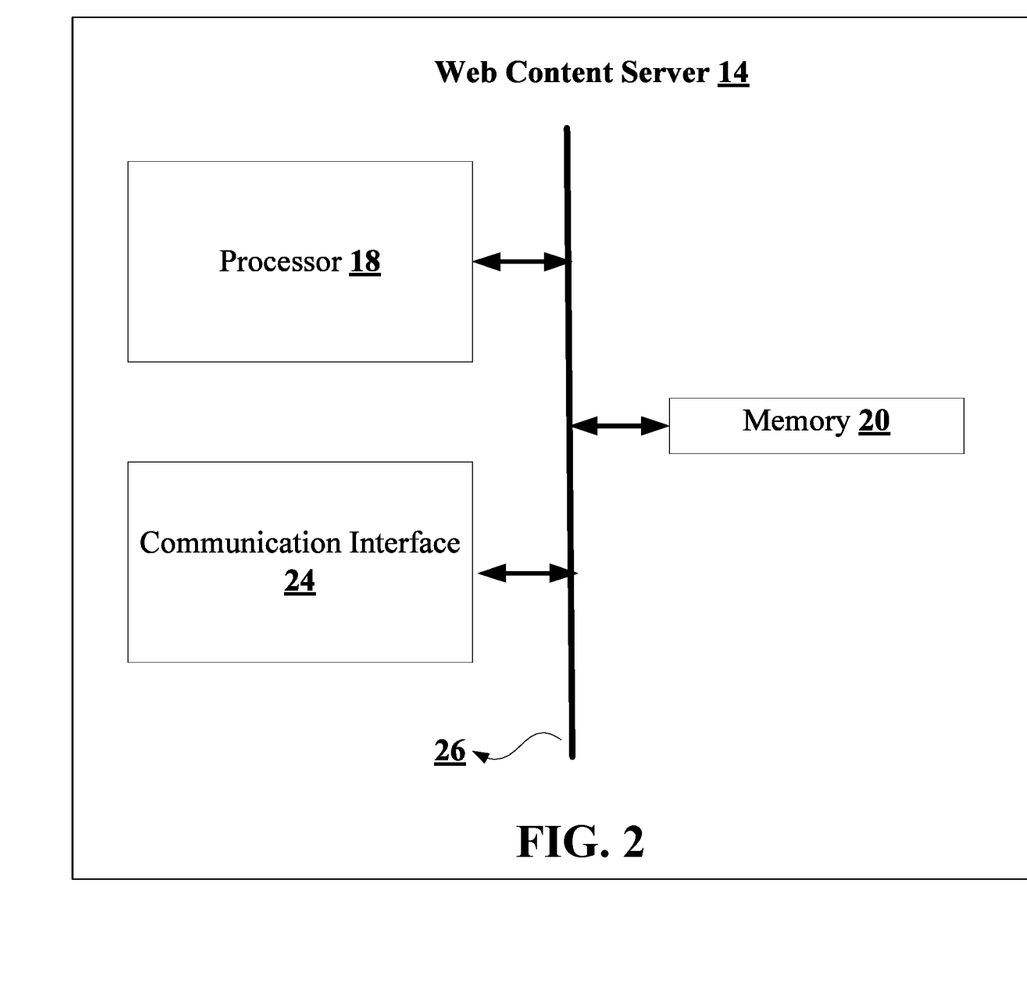
FIG. 2 is a block diagram of the example of the web content server shown in FIG. 1.

An exemplary environment 10 with a web content server 14 coupled to plurality of client computing devices 12(1)-12(n) and plurality of server devices 16(1)-16(n) by communication network 30 is illustrated in FIG. 1. Other numbers and types of systems, devices, and/or elements in other configurations and environments with other communication network topologies can also be used. This technology provides a number of advantages including providing methods, non-transitory computer readable medium, and devices for transforming templates designed for the server side execution to templates that are suitable to be executed on the client side.

Referring more specifically to FIG. 1, the web content server 14 includes a central processing unit (CPU) 18 or processor, a memory 20, and a communication interface 24, which are coupled together by a bus 26 or other link, although other numbers and types of components, parts, devices, systems, and elements in other configurations and locations can be used.

The processor 18 of the web content server 14 may execute one or more programmed instructions stored in the memory 20 for transforming templates designed for the server side execution to templates that are suitable to be executed on the client side as illustrated and described in the examples herein, although other types and numbers of functions and/or other operation can be performed. The processor 18 of the web content server 14 may include one or more central processing units ("CPUs") or general purpose processors with one or more processing cores, such as AMD® processor(s), although other types of processor(s) could be used (e.g., Intel®).

The memory 20 of the web content server 14 stores the programmed instructions and other data for one or more aspects of the present technology as described and illustrated herein, although some or all of the programmed instructions could be stored and executed elsewhere. A variety of different types of memory storage devices, such as a non-volatile memory, random access memory (RAM) or a read only memory (ROM) in the system or a floppy disk, hard disk, CD ROM, DVD ROM, or other computer readable medium which is read from and written to by a magnetic, optical, or other reading and writing system that is coupled to the processor 18, can be used for the memory 20.

The communication interface 24 in the web content server 14 is used to operatively couple and communicate between the web content server 14, plurality of client computing devices 12(1)-12(n), and plurality of server devices 16(1)-16(n) via the communication network 30. One or more of the communication network 30 can include one or more networks, such as one or more local area networks (LANs) and/or wide area networks (WANs). By way of example only, the communication networks 30 can use TCP/IP over Ethernet and industry-standard protocols, including hypertext transfer protocol (HTTP), secure HTTP (HTTPS), wireless application protocol (WAP), and/or SOAP, although other types and numbers of communication networks, such as a direct connection, modems and phone lines, e-mail, and wireless and hardwire communication technology, each having their own communications protocols, can be used.

The plurality of client devices 12(1)-12(n) enable a user to request, receive, and interact with applications, web services, and content hosted by the plurality of server devices 16(1)-16(n) through the web content server 14 via the communication network 30, although one or more of the plurality of client computing devices 12(1)-12(n) could access content and utilize other types and numbers of applications from other sources and could provide a wide variety of other functions for the user. In some examples, the plurality of client computing devices 12(1)-12(n) comprise mobile computing devices with Internet access that enable web pages and other content stored by the plurality of server devices 16(1)-16(n) to be retrieved and rendered. By way of example only, the plurality of client computing devices 12(1)-12(n) can be smart phones, personal digital assistants, or computers.

Each of the plurality of client computing devices 12(1)-12(n) includes a CPU, a memory, an input device, a display device, and an input/output device, which are coupled together by a bus or other link, although one or more of the plurality of client computing devices 12(1)-12(n) can include other numbers and types of components, parts, devices, systems, and elements in other configurations. The CPU in the plurality of client computing devices 12(1)-12(n) can execute a program of instructions stored in the memory of the plurality of client computing devices 12(1)-12(n) for one or more aspects of the present invention as described and illustrated herein, although the CPU could execute other numbers and types of programmed instructions.

The input device in each of the plurality of client computing devices 12(1)-12(n) can be used to input selections, such as a request for a particular web page, although the input device could be used to input other types of requests and data and interact with other elements. The input device can include keypads, touch screens, and/or vocal input processing systems, although other types and numbers of input devices can be used.

The display device in each of the plurality of client computing devices 12(1)-12(n) can be used to show data and information to the user, such as web pages retrieved from the plurality of server devices 16(1)-16(n) by way of example only. The display device in each of the plurality of client computing devices 12(1)-12(n) can be a mobile phone screen display, although other types and numbers of displays could be used depending on the particular type of client device.

The input/output device in each of the plurality of client computing devices 12(1)-12(n) can be used to operatively couple and communicate between the plurality of client computing devices 12(1)-12(n), the web content server 14, and the plurality of server devices 16(1)-16(n) over the communication network 30.

Each of the plurality of server devices 16(1)-16(n) provides content including web pages for use by one or more of the plurality of client computing devices 12(1)-12(n) via the web content server 14, although the plurality of server devices 16(1)-16(n) can provide other numbers and types of content and perform other functions. Each of the plurality of server devices 16(1)-16(n) can include a CPU, a memory, and an input/output device, which are coupled together by a bus or other link, although each of the plurality of server devices 16(1)-16(n) could have other numbers and types of components, parts, devices, systems, and elements in other configurations and locations.

The CPU in each of the plurality of server devices 16(1)-16(n) executes a program of instructions stored in the memory of the plurality of server devices 16(1)-16(n) for one or more aspects of the present invention, as described and illustrated by way of the embodiments herein, although the CPU could execute other numbers and types of programmed instructions.

The input/output device in each of the plurality of server devices 16(1)-16(n) is used to operatively couple and communicate between the plurality of server devices 16(1)-16(n), the web content server 14, and the plurality of client computing devices 12(1)-12(n) via the communication network 30.

Although embodiments web content server 14, the plurality of client computing devices 12(1)-12(n), and the plurality of server devices 16(1)-16(n) are described and illustrated herein, each of the web content server 14, the plurality of client computing devices 12(1)-12(n), and the plurality of server devices 16(1)-16(n) can be implemented on any suitable computer apparatus or computing device. It is to be understood that the apparatuses and devices of the embodiments described herein are for exemplary purposes, as many variations of the specific hardware and software used to implement the embodiments are possible, as will be appreciated by those skilled in the relevant art(s).

Furthermore, each of the devices of the embodiments may be conveniently implemented using one or more general purpose computers, microprocessors, digital signal processors, and micro-controllers, programmed according to the teachings of the embodiments, as described and illustrated herein, and as will be appreciated by those ordinary skill in the art.

In addition, two or more computing apparatuses or devices can be substituted for any one of the devices in any embodiment described herein. Accordingly, principles and advantages of distributed processing, such as redundancy and replication also can be implemented, as desired, to increase the robustness and performance of the devices of the embodiments. The embodiments may also be implemented on computer apparatuses or devices that extend across any suitable network using any suitable interface mechanisms and communications technologies, including by way of example only telecommunications in any suitable form (e.g., voice and modem), wireless communications media, wireless communications networks, cellular communications networks, G3 communications networks, Public Switched Telephone Network (PSTNs), Packet Data Networks (PDNs), the Internet, intranets, and combinations thereof.

The embodiments may also be embodied as one or more non-transitory computer readable medium having instructions stored thereon for one or more aspects of the present invention as described and illustrated by way of the embodiments herein, as described herein, which when executed by a processor, cause the processor to carry out the steps necessary to implement the methods of the embodiments, as described and illustrated herein.

An exemplary method for transforming templates designed for the server side execution to templates that are suitable to be executed on the client side will now be described with reference to FIGS. 1-7.

Figure 3:
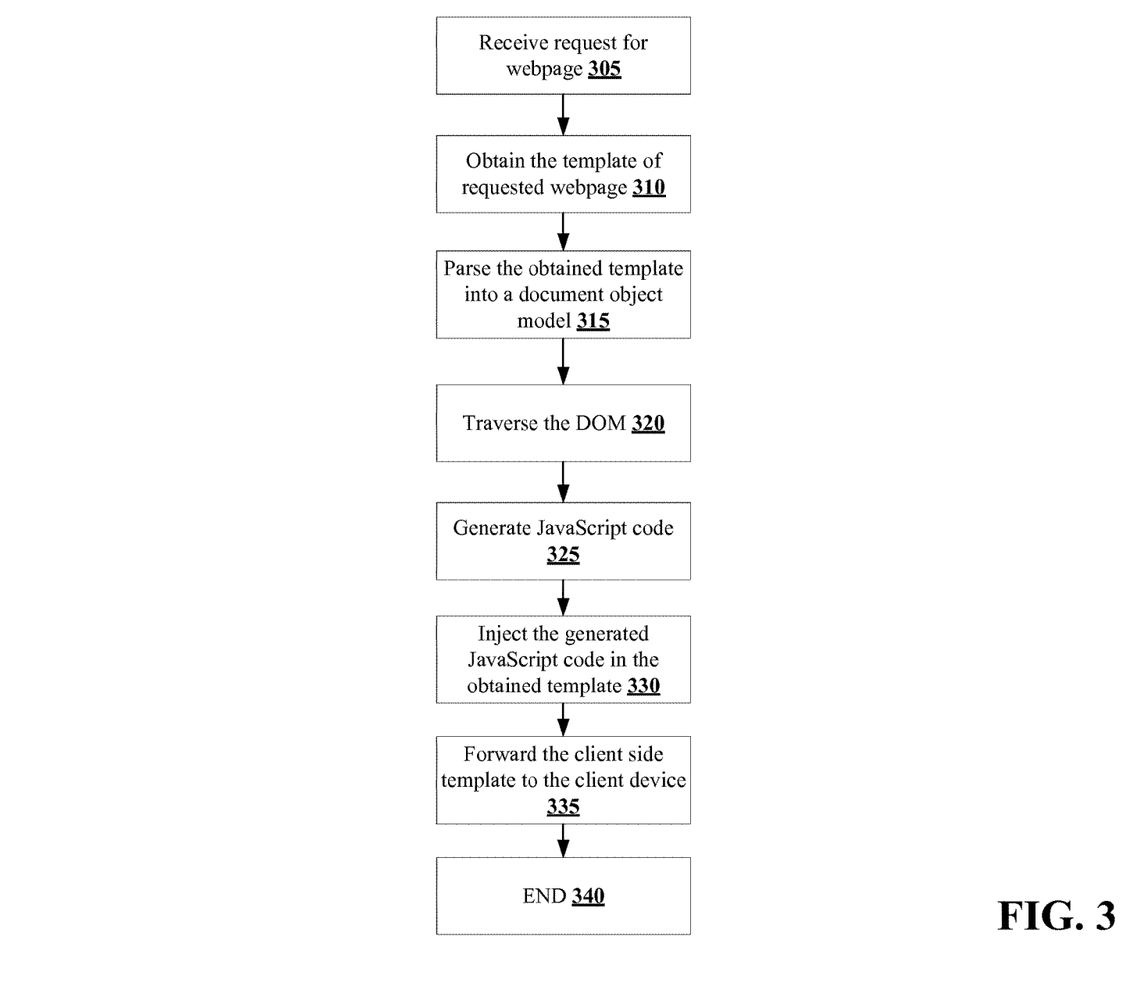
FIG. 3 is a flow chart of an example of a method for transforming server side template into a client side template.

The exemplary method begins at step 305 where the web content server 14 receives a request for a web page from one of the plurality of client computing devices 12(1)-12(n). In this example, the requested web page is a hypertext markup language (HTML) or extensible markup language template of web page stored by one of the plurality of server devices 16(1)-16(n).

Figure 4:
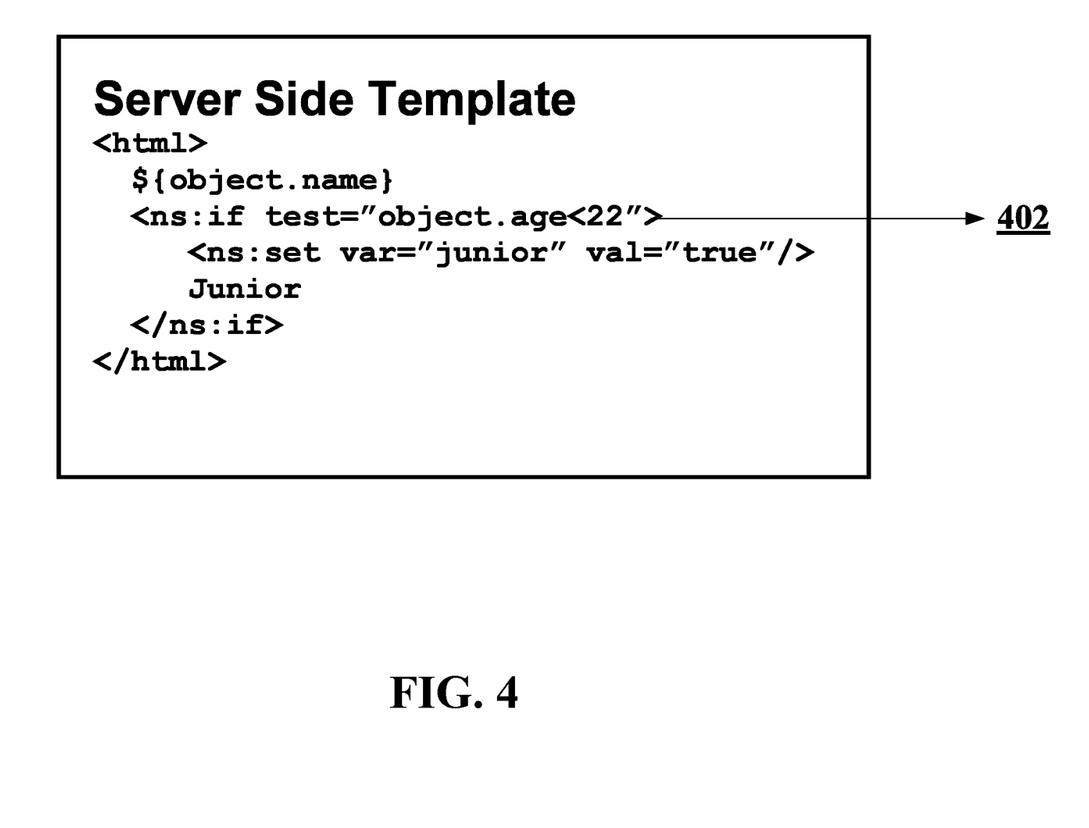
FIGS. 4-5 are exemplary server side templates.
Figure 5:
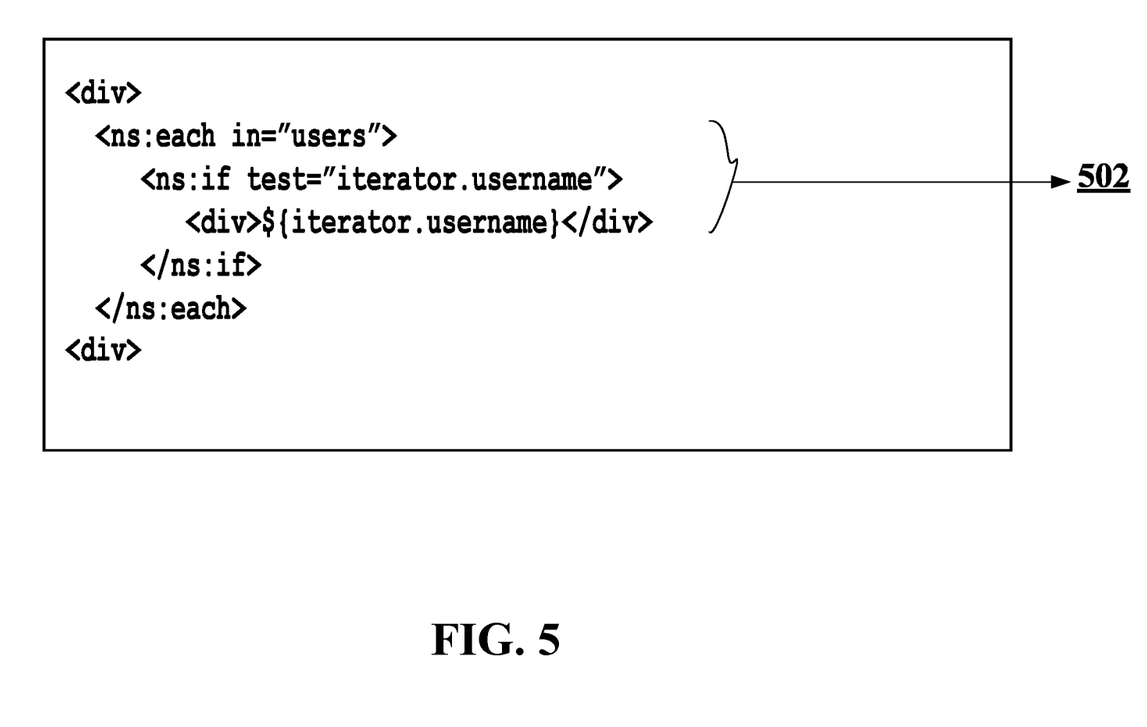
Figure 6:
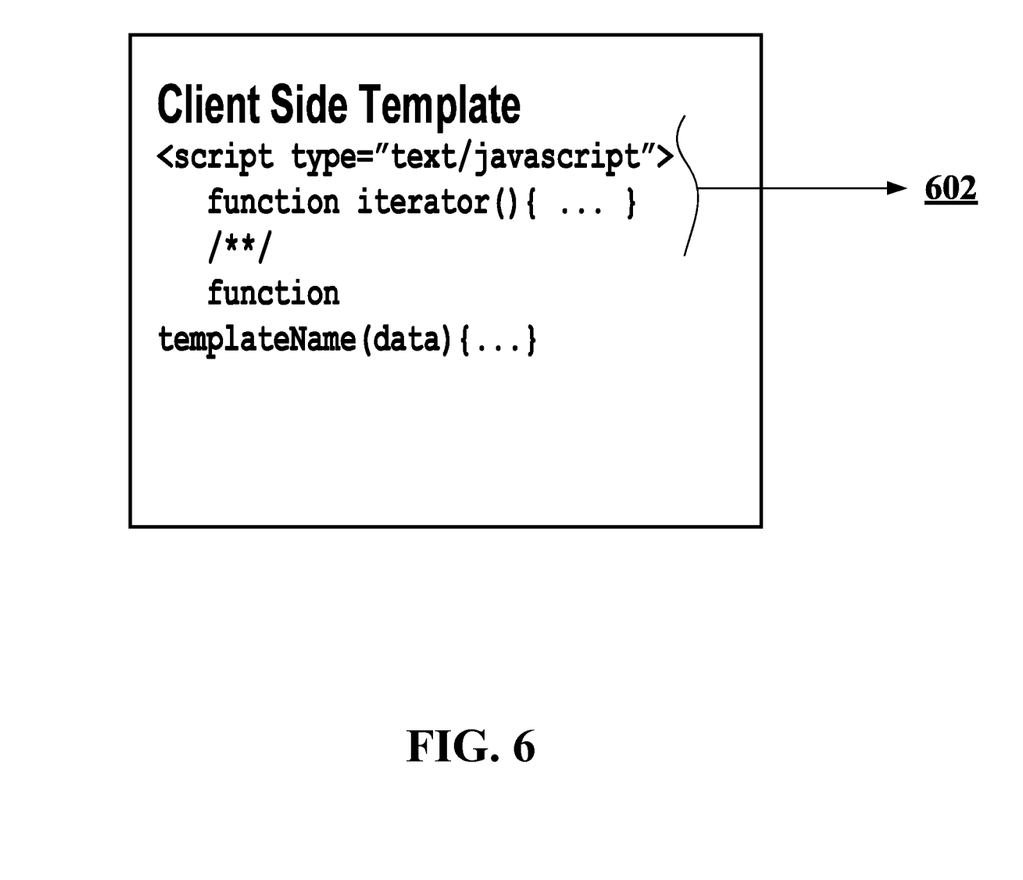
FIGS. 6-7 are exemplary client side templates that are transformed from the server side templates.

Upon receipt of the request from one of the plurality of client computing devices 12(1)-12(n), in step 310 the web content server 14 obtains the template of the requested web page. In this example, the web content server 14 obtains the requested web page by retrieving the template of requested web page from the one of the plurality of server devices 16(1)-16(n) on behalf of the requesting one of the plurality of client computing devices 12(1)-12(n). By way of example only, the template of the requested webpage that is obtained by the web content server 14 is illustrated in FIG. 4. Additionally, another example of the server side template obtained by the web content server 14 is illustrated in FIG. 5. As illustrated in FIGS. 4-5, the template (server side template) of the requested webpage obtained by the web content server 14 includes full support of HTML tags and support of special tags that are able to perform some special operations, such as iteration over a collection of items; evaluation of logical conditions; set of variables; and print of variables, although the server side template can include other types and/or amounts of information.

In step 315, the web content server 14 parses the obtained server side template and generates a document object model (DOM) based on the parsed content.

In step 320, the web content server 14 traverses through each line in the DOM to identify: the types of HTML instructions, such as static HTML instructions; HTML tags including any special tags, condition tag, iteration tag; variable print instructions; and variable set instructions, although the web content server 14 can identify other types and/or amounts of instructions or other information. By way of example only, line 402 in FIG. 4 illustrates the condition tag and line 502 of FIG. 5 illustrates the iteration tag that is identified by the web content server 14.

Figure 7:
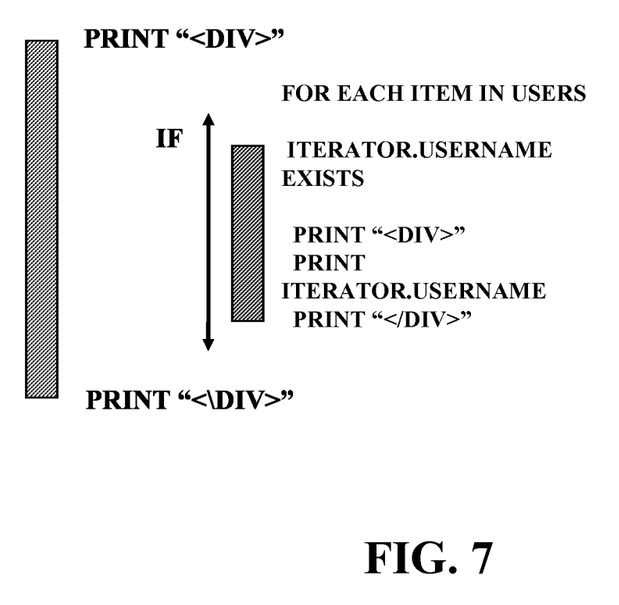

In step 325, the web content server 14 generates JavaScript code representing the exact same procedure illustrated in the HTML instructions in the DOM as the client side template for each identified type of HTML instruction. By way of example only, the web content server 14 generates the JavaScript code 602 illustrated in FIG. 6 for the condition tag in the HTML instruction illustrated in line 402 of FIG. 4. In this example, when the web content server 14 encounters a condition tag while traversing the DOM, it generates a JavaScript fragment that illustrates the condition and injects the inner content inside the condition tag as illustrated in line 602 of FIG. 6. Additionally, the web content server 14 generates a JavaScript code illustrated in FIG. 7 for the iteration tag illustrated in line 502 of FIG. 5. In this example, when the web content server 14 encounters an iteration tag while traversing the DOM, it invokes a specifically crafted utility function passing the whole iteration tag as a parameter. The function will take care of interpreting the iteration code and transform it into a JavaScript iterator that will also evaluate all the inner content as illustrated in FIG. 7, by way of example only. The dynamic HTML based template extends the basic HTML instructions by adding logical commands such as conditions, iterations and transformations. The result of the server side interpretation of the HTML template is an HTML page that differs in the content by contextual factors.

In step 330, upon transforming each identified type of HTML instruction to an equivalent JavaScript code, the web content server 14 transforms the server side template to a client side template by injecting the generated JavaScript code in the obtained server side template, although the web content server 14 can inject other types and/or amounts of information. In this example, the resulting client side template includes a number of utility JavaScript functions that can receive parameters. By generating the client side template using this technique, this example of the technology transforms a server side template into an autonomous JavaScript based client side template, without the need of an intermediate template language to be reinterpreted on the browser of the requesting one of the plurality of client computing devices 12(1)-12(n).

In step 335, the web content server 14 forwards the client side template to the requesting one of the plurality of client computing devices 12(1)-12(n) responsive to the received request for the webpage. Upon receipt of the client side template, the web browser in the requesting one of the plurality of client computing devices 12(1)-12(n) may execute the client side template resulting in the rendering of the requested webpage. While the web browser of the requesting one of the plurality of client computing devices 12(1)-12(n) executes the client side template, at a certain stage of the flow in the execution of the client side template will trigger the JavaScript code that will retrieve data in JavaScript Object Notion (JSON) format from one of the plurality of server devices 16(1)-16(n) hosting the requested webpage, although the data can be obtained in other formats. This example of the method ends in step 340.

Accordingly, as illustrated and described by way of the examples herein this technology effectively transforms templates designed for the server side execution to templates that are suitable to be executed on the client side. Additionally, this technology allows developers to use one language for both developing server side pages and client side content. Further with this technology, the server side templates can be transformed to client side templates that allow the creation of complex web pages where the displayed data can change without the page being reloaded. Even further, with this technology by directly transforming the server side template to a client side template, an autonomous JavaScript based template is created for the client side without the need of an intermediate template language to be reinterpreted on the browser of the client device.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for transforming executable webpage templates, the method implemented by a web content sever and comprising:
    obtaining, responsive to a request for a webpage received from a client device, a server executable webpage template for the webpage comprising a plurality of Hypertext Markup Language (HTML) and logical instructions;
    parsing the obtained server executable webpage template to generate a document object model (DOM);
    traversing the generated DOM to identify one or more instructions in the plurality of HTML and logical instructions having a type comprising a condition tag, an iteration tag, a variable print instruction, or a variable set instruction;
    transforming the obtained server executable webpage template to a client executable webpage template by:
        generating an equivalent JavaScript code for each of the identified one or more instructions, wherein the equivalent JavaScript code is different for each of the identified one or more instructions based on the type of each of the identified one or more instructions; and
        replacing each of the identified one or more instructions in the server executable template with the generated equivalent JavaScript code prior to responding to the request for the webpage received from the client device, wherein the client executable webpage template is in an executable form for execution by the client device without further processing; and
    sending the client executable webpage template to the client device in response to the request for the webpage received from the client device.

2. The method as set forth in claim 1, further comprising generating the equivalent JavaScript code configured to express a condition and inject an inner content of the condition inside a branch of the condition, when the type is the condition tag.

3. The method as set forth in claim 1, further comprising generating the equivalent JavaScript code configured to invoke a specifically crafted utility function to pass the iteration tag as a parameter, when the type is the iteration tag.

4. The method as set forth in claim 1, further comprising transforming the variable print instruction into a JavaScript print instruction, when the type is the variable print instruction.

5. The method as set forth in claim 1, further comprising transforming the variable set instruction into a JavaScript variable set instruction, when the type is the variable set instruction.

6. The method as set forth in claim 1, wherein the equivalent JavaScript code in the client executable webpage template is configured to generate content corresponding to a portion of the webpage when executed by the client device.

7. A non-transitory computer readable medium having stored thereon instructions for transforming executable webpage templates comprising machine executable code which when executed by a processor, causes the processor to:
    obtain responsive to a request for a webpage received from a client device, a server executable webpage template for the webpage comprising a plurality of Hypertext Markup Language (HTML) and logical instructions;
    parse the obtained server executable webpage template to generate a document object model (DOM);
    traverse the generated DOM to identify one or more instructions in the plurality of HTML and logical instructions having a type comprising a condition tag, an iteration tag, a variable print instruction, or a variable set instruction;
    transform the obtained server executable webpage template to a client executable webpage template by:
        generating an equivalent JavaScript code for each of the identified one or more instructions, wherein the equivalent JavaScript code is different for each of the identified one or more instructions based on the type of each of the identified one or more instructions; and
        replacing each of the identified one or more instructions in the server executable template with the generated equivalent JavaScript code prior to responding to the request for the webpage received from the client device, wherein the client executable webpage template is in an executable form for execution by the client device without further processing; and
    send the client executable webpage template to the client device in response to the request for the webpage.

8. The non-transitory computer readable medium as set forth in claim 7, wherein the executable code, when executed by the processor, further causes the processor to generate the equivalent JavaScript code configured to express a condition and inject an inner content of the condition inside a branch of the condition, when the type is the condition tag.

9. The non-transitory computer readable medium as set forth in claim 7, wherein the executable code, when executed by the processor, further causes the processor to generate the equivalent JavaScript code configured to invoke a specifically crafted utility function to pass the iteration tag as a parameter, when the type is the iteration tag.

10. The non-transitory computer readable medium as set forth in claim 7, wherein the executable code, when executed by the processor, further causes the processor to transform the variable print instruction into a JavaScript print instruction, when the type is the variable print instruction.

11. The non-transitory computer readable medium as set forth in claim 7, wherein the executable code, when executed by the processor, further causes the processor to transform the variable set instruction into a JavaScript variable set instruction, when the type is the variable set instruction.

12. The non-transitory computer readable medium as set forth in claim 7, wherein the equivalent JavaScript code in the client executable webpage template is configured to generate content corresponding to a portion of the webpage when executed by the client device.

13. A web content server, comprising:
a processor;
a memory coupled to the processor and comprising programmed instructions stored thereon, wherein the processor is configured to execute the stored programmed instructions to:
  obtain responsive to a request for a webpage received from a client device, a server executable webpage template for the webpage comprising a plurality of Hypertext Markup Language (HTML) and logical instructions;
  parse the obtained server executable webpage template to generate a document object model (DOM);
  traverse the generated DOM to identify one or more instructions in the plurality of HTML and logical instructions having a type comprising a condition tag, an iteration tag, a variable print instruction, or a variable set instruction;
  transform the obtained server executable webpage template to a client executable webpage template by:
    generating an equivalent JavaScript code for each of the identified one or more instructions, wherein the equivalent JavaScript code is different for each of the identified one or more instructions based on the type of each of the identified one or more instructions; and
    replacing each of the identified one or more instructions in the server executable template with the generated equivalent JavaScript code prior to responding to the request for the webpage received from the client device, wherein the client executable webpage template is in an executable form for execution by the client device without further processing; and
  send the client executable webpage template to the client device in response to the request for the webpage.

14. The web content server as set forth in claim 13, wherein the processor is further configured to execute the stored programmed instructions to generate the equivalent JavaScript code configured to express a condition and inject an inner content of the condition inside a branch of the condition, when the type is the condition tag.

15. The web content server as set forth in claim 13, wherein the processor is further configured to execute the stored programmed instructions to generate the equivalent JavaScript code configured to invoke a specifically crafted utility function to pass the iteration tag as a parameter, when the type is the iteration tag.

16. The web content server as set forth in claim 13, wherein the processor is further configured to execute the stored programmed instructions to transform the variable print instruction into a JavaScript print instruction, when the type is the variable print instruction.

17. The web content server as set forth in claim 13, wherein the processor is further configured to execute the stored programmed instructions to transform the variable set instruction into a JavaScript variable set instruction, when the type is the variable set instruction.

18. The web content server as set forth in claim 13, wherein the equivalent JavaScript code in the client executable webpage template is configured to generate content corresponding to a portion of the webpage when executed by the client device.

* * * * *